Figure 1:
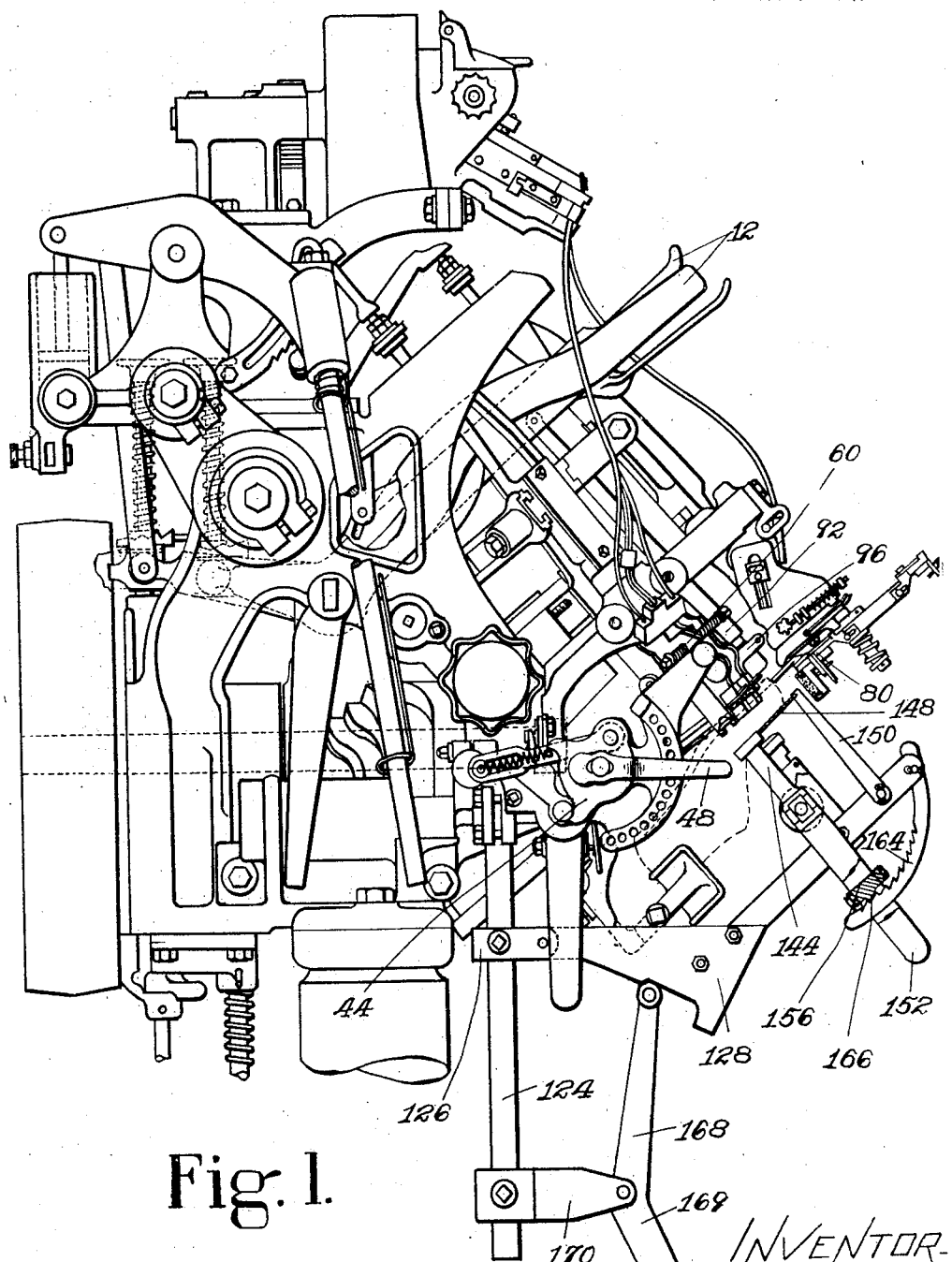

O. ASHTON, DEC'D.
H. ASHTON, EXECUTRIX.
PULLING-OVER MACHINE.
APPLICATION FILED NOV. 2, 1916.

1,396,005.

Patented Nov. 8, 1921.
5 SHEETS—SHEET 3.

INVENTOR
Orrell Ashton, Dec'd.
Hannah Ashton, Executrix
By Nelson W. Howard
Attorney.

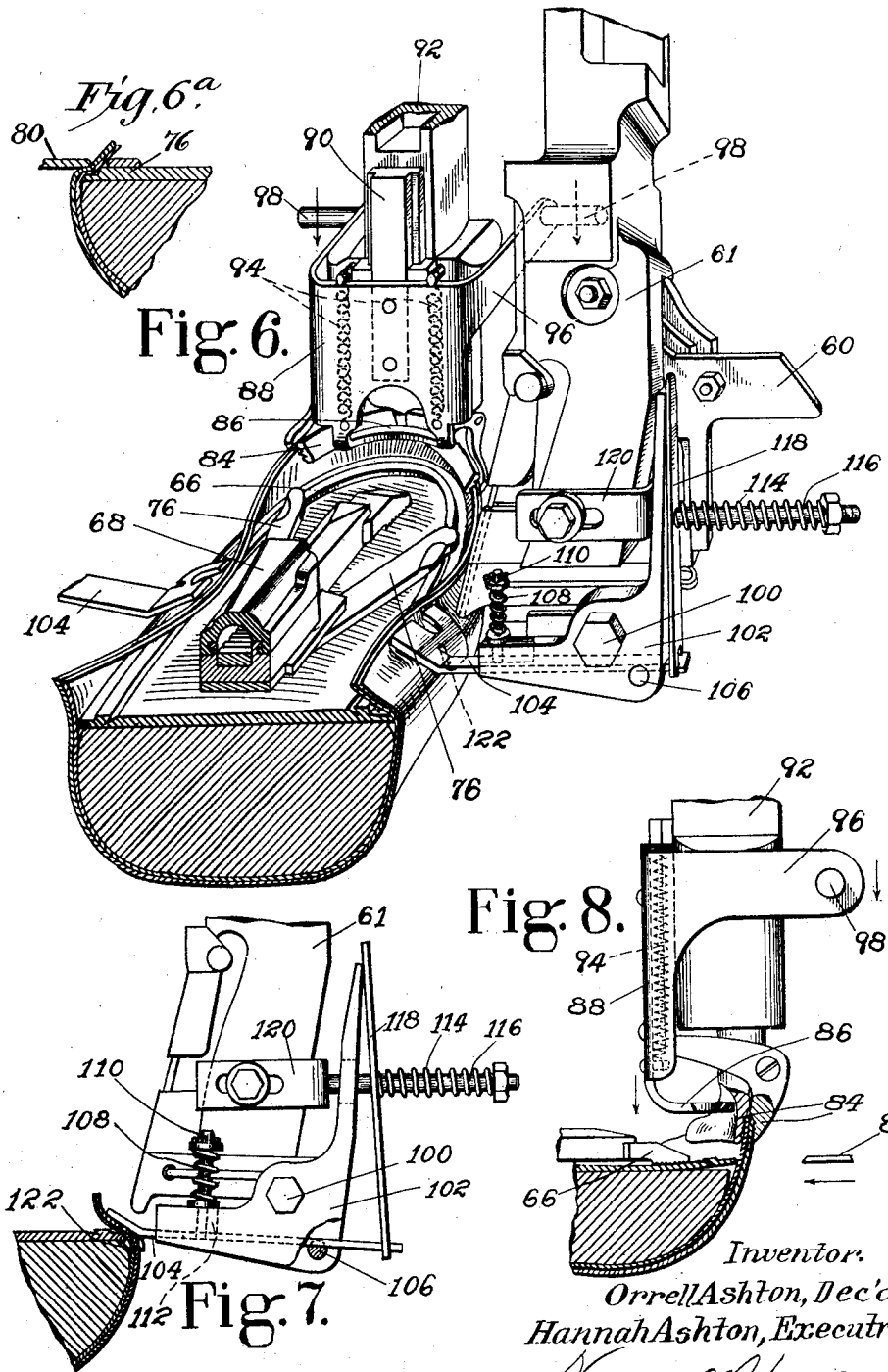

O. ASHTON, DEC'D.
H. ASHTON, EXECUTRIX.
PULLING-OVER MACHINE.
APPLICATION FILED NOV. 2, 1916.

1,396,005.

Patented Nov. 8, 1921.
5 SHEETS—SHEET 5.

INVENTOR-
Orrell Ashton, Deceased.
Hannah Ashton, Executrix.

By, Nelson W. Howard
Attorney.

UNITED STATES PATENT OFFICE.

ORRELL ASHTON, DECEASED, LATE OF SWAMPSCOTT, MASSACHUSETTS, BY HANNAH ASHTON, EXECUTRIX, OF WOLLASTON, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

PULLING-OVER MACHINE.

1,396,005.   Specification of Letters Patent.   Patented Nov. 8, 1921.

Application filed November 2, 1916. Serial No. 129,214.

*To all whom it may concern:*

Be it known that ORRELL ASHTON, late of Swampscott, in the county of Essex and State of Massachusetts, deceased, invented certain Improvements in Pulling-Over Machines, of which the following description, in connection with the accompanying drawings, is a specification, like reference characters on the drawings indicating like parts in the several figures.

This invention relates to machines for use in the manufacture of boots and shoes for working the upper over the last, and has for an important object the improvement of machines of this class in certain respects which will be hereinafter pointed out, to the end that better work than heretofore may be performed with greater economy of time. The invention is herein illustrated as embodied in a machine for performing both pulling-over and lasting operations on a shoe and more particularly adapted for use in the manufacture of turn shoes; but it will be apparent from a consideration of the following description that the invention in many of its features is not necessarily limited to machines of this particular type.

An important feature of the invention, as applied for example to machines having the usual pulling-over grippers and fastening means, consists in novel means for imparting to the side grippers movement lengthwise of the last, the construction shown comprising means for effecting a withdrawal of said grippers to avoid interference with the instrumentalities that operate subsequently to fasten the upper in its pulled-over position. In machines as commonly constructed heretofore the side grippers have been moved inwardly toward the longitudinal median line of the shoe to permit the overlaying and fastening of the upper. It is found, however, that in such position, particularly in the case of comparatively small shoes, the grippers are frequently in the way of such mechanism as it is found desirable to use for performing the overlaying and fastening operations. This invention, in its illustrative embodiment, accordingly provides means for withdrawing the side grippers longitudinally of the shoe to such position as to avoid interference with the subsequently operating instrumentalities. In the construction shown the withdrawal of the grippers, as well as their subsequent return, is effected automatically, but it should be understood that the invention in its broader aspects is not limited to automatic means for withdrawing or returning the grippers.

A further feature of the invention consists in novel means for avoiding conditions likely to result from accidental upward bending of the margin of the sole or innersole of the shoe, hereinafter termed generically the "sole," in the upper pulling or like operation. In the pulling-over operation, particularly as applied to turn shoes in which the sole projects beyond the edge of the last, the margin of the sole is frequently lifted from the bottom of the last by the friction of the upper materials on the sole edge. If the margin remains in this condition during the over-drawing or overlaying of the upper, the feather of the sole is likely to be turned inward in such manner as to render the product of subsequent operations imperfect. In order to guard against such results this invention provides novel means for insuring that the margin of the sole shall be in its proper place when the upper is carried inwardly over it, comprising a novel organization of sole engaging means and mechanism for insuring withdrawal of such means to permit the upper to be carried over the margin of the sole and fastened. As applicable more particularly to turn shoe work, the invention contemplates the provision of sole positioning means opposed to that portion of the margin of the sole which projects beyond the edge of the last. For insuring, further, the correct location of the feather of the sole on the last, engagement of the sole positioning means with the feather is contemplated where such engagement is found desirable. Within the scope of the invention, moreover, is the provision of means for engaging the margin of the sole to replace it in the event of its having been raised from the last in the upper pulling operation. The construction herein shown includes means both for holding down the margin of the sole at the sides of the forepart during the updraw movement of the grippers and for replacing the margin at the toe end of the sole in proper position in the event of its having been lifted from the last.

The invention also provides, as a further feature, means for securing improved results in the relative manipulation of different elements of upper materials such as the upper proper and the lining. Such means, in the construction herein shown, is of particular utility as applied to turn shoe work, although in its broader aspects the invention involved in the feature in question is not necessarily thus restricted in its application. It is frequently deemed desirable in pulling-over operations on turn shoes to pull the lining in some degree as well as the upper, and according to one method of procedure the upper and the lining are both entered in the grippers when the work is presented to the machine and are operated upon together. When the materials are thus treated, however, in the case of such shoes as have tips, the lining, which in a turn shoe is outside of the upper at this stage, conceals the tip seam and makes it difficult to adjust the upper materials in such manner as to insure the correct location of the tip line. As an alternative, therefore, some manufacturers prefer to turn back the toe portion of the lining from the upper in order to reveal the tip seam and to pull the upper alone by means of the grippers, depending upon the subsequent action of the overlaying and fastening means to draw the lining smoothly over the upper. This procedure, however, cannot be depended upon in all cases to pull the lining sufficiently to avoid the presence of lining wrinkles in the turned shoe. As a remedy for these difficulties, this invention, in its illustrative embodiment, provides means for gripping the upper and the lining independently in such manner that the upper may be first entered in the proper grippers and the tip then straightened while the lining is turned back to reveal the tip seam, after which the lining is entered in the secondary grippers and the upper and the lining are pulled over together. The construction shown insures also against excessive strain upon the lining, such as might cause it to tear, by rendering the pulling means effective successively upon the upper and the lining and also by permitting the lining to slip in the grippers before such a strain is encountered.

A further feature of the invention consists in novel means for insuring the proper condition of the upper materials at the forepart of the shoe before the materials are fastened to the sole. The construction shown comprises means for holding the upper materials in position about the toe end of the last in such manner as to permit the release of the toe gripper before the materials are carried over the margin of the sole and fastened, thus eliminating danger that the tension of the materials may be unduly relaxed. An effective construction embodying this feature comprises a flexible device conformable to the shape of the last and operated to clamp the materials smoothly in position about the toe. An important characteristic of the construction embodying this feature of the invention, moreover, resides in provision for movement over the upper materials in the direction of the bottom edge of the last, which serves to equalize any fullness in the materials and to avoid the formation of wrinkles or creases, and in the case of turn shoes serves to smooth the lining over the upper. Associated with this mechanism, in the construction shown, is also means for supporting the last and the shoe against the action of the wipers and the tack drivers, and this novel arrangement of shoe supporting means constitutes a further feature of the invention.

Still another feature of the invention resides in improved means for overlaying the upper materials at the sides of the shoe and for holding them in position in the interval between the release of the grippers and the insertion of the fasteners. The illustrative machine, in its embodiment of this feature, provides overlaying and clamping means of novel construction carried by the side tacker arms and arranged to operate upon the inward movement of the tacker arms to press the upper against the margin and the edge of the sole and retain it in position until the tacks have been driven.

The various features of the invention, including those above referred to, will now be described with reference to the accompanying drawings and pointed out in the claims.

Figure 2:
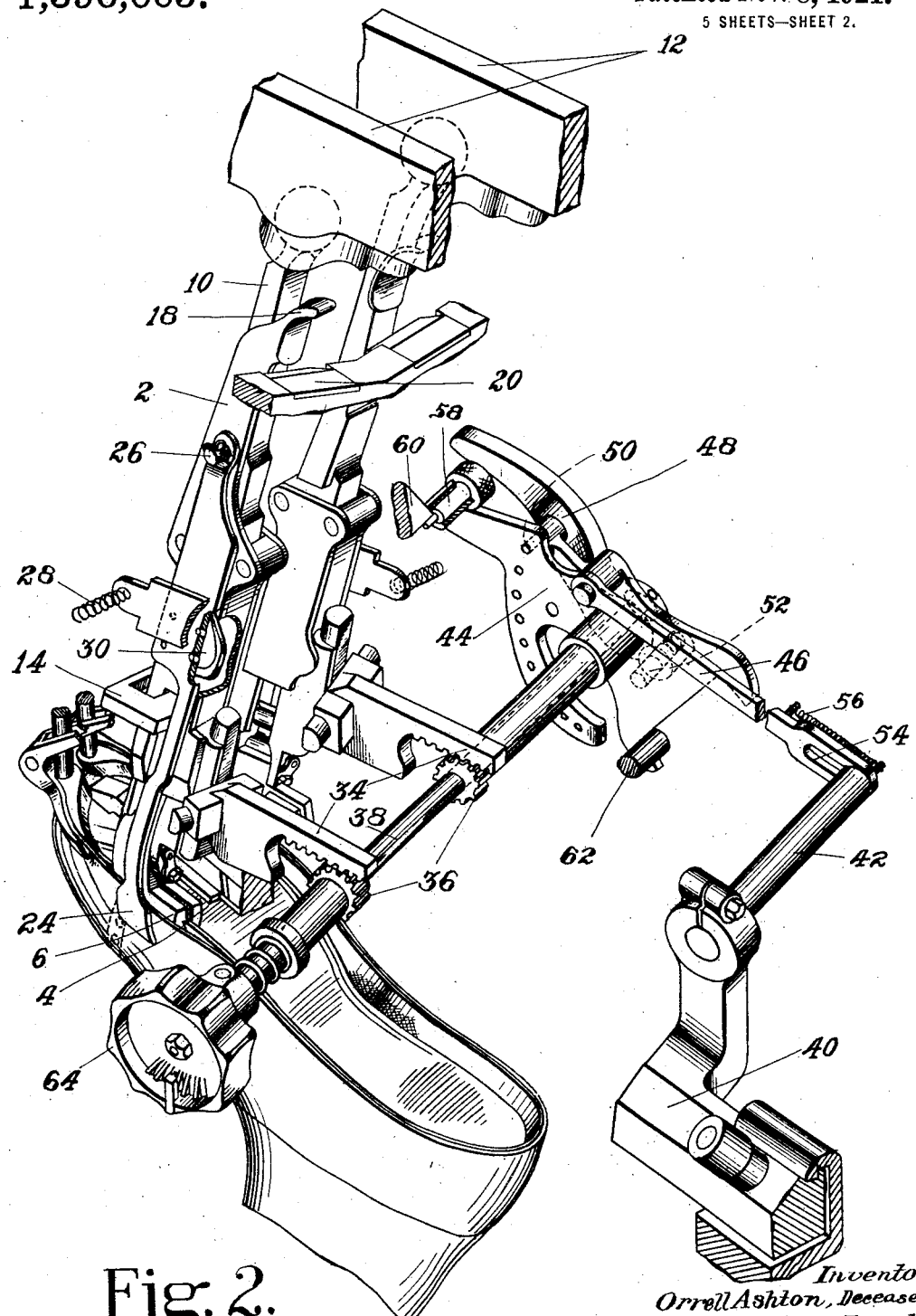
Figures 3, 4, 5:
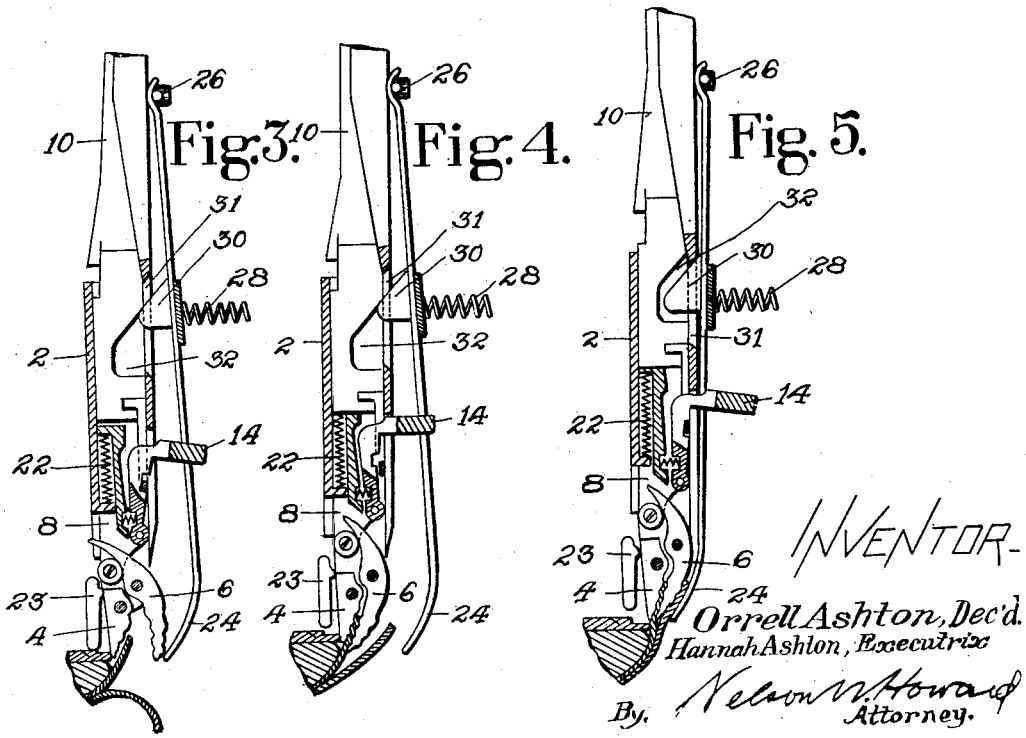

In the drawings:

Figure 1 is a view in side elevation of the head portion of a pulling-over and lasting machine in which the invention is embodied, Fig. 2 is a perspective view of a portion of the machine including the side gripper mechanism, showing the parts as positioned during the updraw operation, Figs. 3, 4 and 5 are views in vertical section of one of the side gripper mechanisms, illustrating successive stages in the operation, Fig. 6 is a perspective view showing in greater detail than Fig. 1 the novel means with which the machine is provided for holding down the margin of the sole at the sides and for replacing the uplifted margin at the toe, and also for holding the upper at the sides of the shoe in its pulled-over position, Fig. 6ª is a detail sectional view illustrating the relation of the side hold-down mechanism to the wipers.

Figure 9:
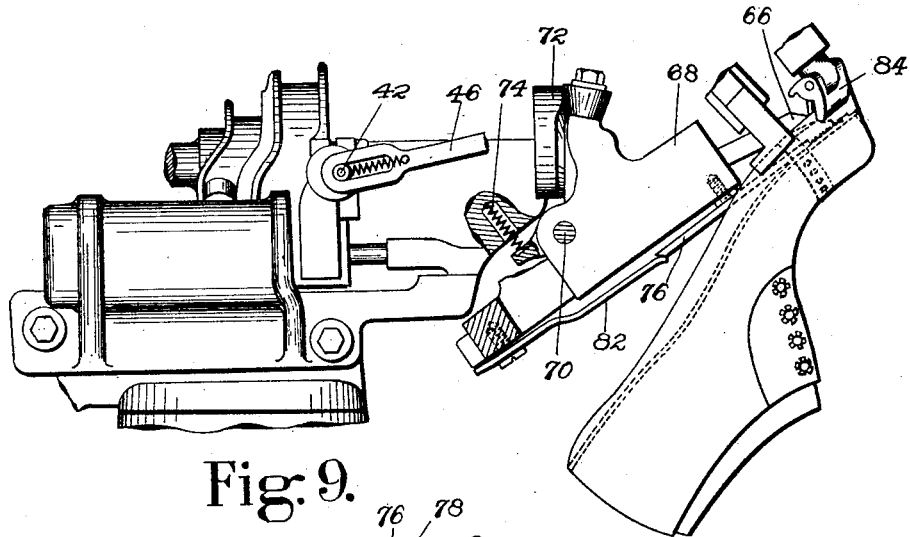
Figure 10:
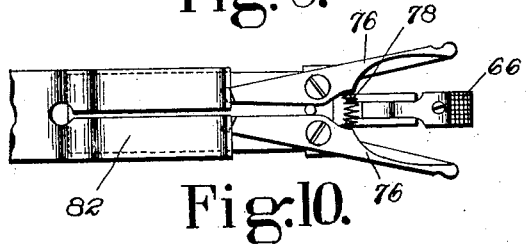
Figure 11:
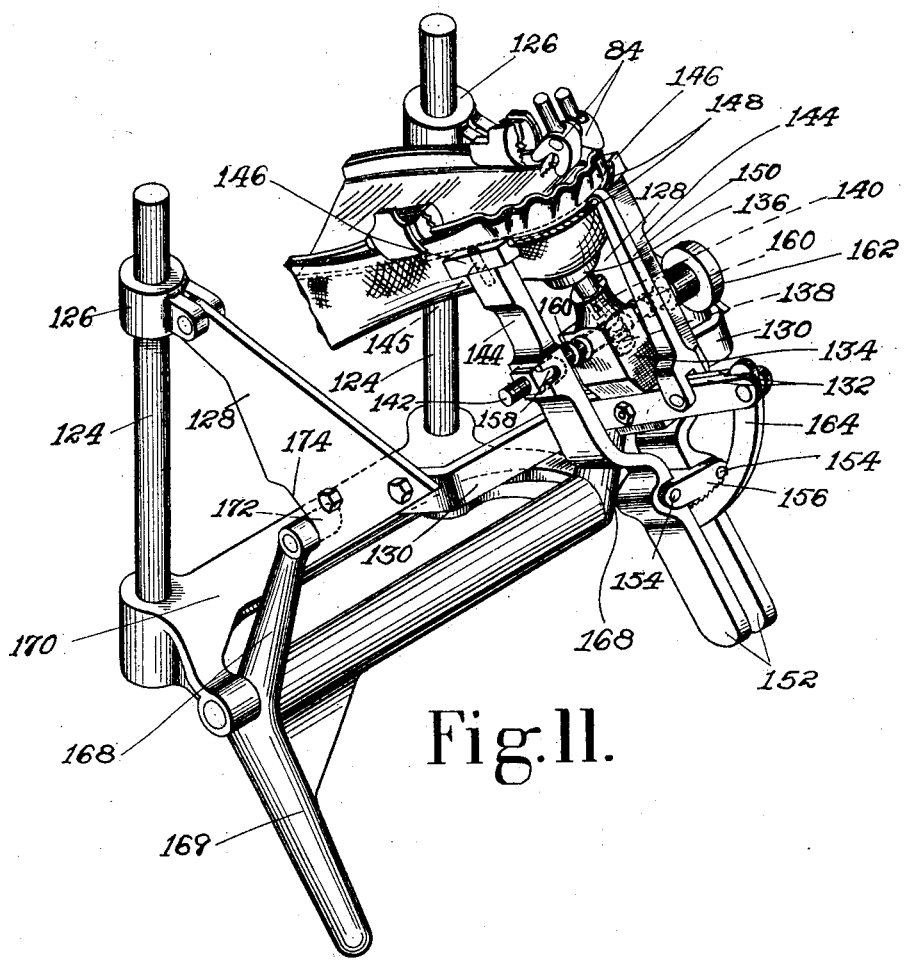

Fig. 7 is a view in elevation of the upper holding means seen in Fig. 6, illustrating a later stage in the inward movement of the tacker arm, Fig. 8 shows in side elevation the toe end sole replacing means shown in Fig. 6, Fig. 9 is a view in side elevation, and partly in section, of a portion of the machine including the means shown in Fig. 6 for holding down the margin of the sole at the sides, Fig. 10 is an inverted plan view of a portion of the sole holding means, and Fig. 11 is a perspective view of the novel means with which the machine is provided for retaining the upper materials at the toe in their pulled-over position and for supporting the last.

The invention is conveniently illustrated as embodied in a machine having general features of construction similar to those of the turn shoe pulling-over and lasting machine shown in United States Letters Patent No. 1,280,613, granted on October 1, 1918, upon application of Orrell Ashton, which may be consulted for a better understanding of such details as are not intimately related to the novel features of this invention and are not herein specifically described. It should be understood, however, that the utility of the various novel features of the invention is not necessarily dependent upon their collective arrangement as parts of an organization such as shown, and that the invention is not necessarily restricted in all its features to use in the manufacture of turn shoes.

The machine includes side grippers which may be constructed and operated in substantially the same manner as the side grippers shown in the prior patent mentioned. Each side gripper mechanism, as thus constructed, comprises a gripper casing 2 on the lower end of which is mounted a fixed gripper jaw 4 and a pivoted jaw 6, and means for operating the jaws to grip and pull the stock comprising a slide 8 for effecting a closing movement of the jaw 6 and a bar 10 carried by a lever 12 and acting through the slide and the casing to impart pulling movement to the jaws. A latch 14 pivoted on the slide 8 serves to connect the slide to the operating bar 10 for securely closing the jaws upon an upward movement of the bar, and after the pulling operation the latch is engaged by the corresponding side tracker arm to trip the slide and cause the jaws to release the stock. In the downward movement of the bar 10, upon engagement of an ear 18 on the gripper casing with an abutment 20, the latch 14 again connects the bar with the slide 8 to cause the jaws to be fully opened, the parts coming to rest with a light spring 22 between the slide 8 and the gripper casing under compression. While the parts are in this position the latch 14 may be tripped, by hand or by means of a tripper 23 engaged by the shoe sole, as fully explained in the prior patent hereinbefore referred to, to release the slide to the action of the spring 22 and cause the gripper jaws to close lightly upon the stock inserted between them, after which the upper may be adjusted in the side grippers to straighten the tip before the clutch is tripped to cause the machine to operate to pull the upper. For a more complete understanding of the details of the construction as thus far set forth, reference may be made to the earlier patent.

In the present construction the jaws 4 and 6 are intended for gripping between them only the upper of the shoe, as distinct from the lining, this portion of the upper materials of a turn shoe in the pulling-over operation being positioned next to the last. For operating upon the lining an additional gripper jaw 24 is provided, this jaw in the illustrative construction coöperating with the outer side portion of the jaw 6 to form a lining gripper. The outer side of the jaw 6 may be corrugated, as shown, for more secure engagement with the material, but the inner face of the jaw 24 is preferably smooth for a purpose which will be hereinafter explained. The jaw 24 is suspended at 26 on the outer side of the casing 2 and is pressed inward toward the casing and toward closed position with reference to the jaw 6 by means of the spring 28 usually provided in machines of the illustrative type for imparting inward swinging movement to the side gripper mechanism. Cam projections 30 on the inner side of the jaw 24 engage in slots 31 in the casing 2 to guide the jaw in its swinging movements, and when the machine is operated to pull the upper materials the projections 30 are received within coöperating recesses 32 in the bar 10, as shown in Fig. 5, to permit the jaw 24 to be closed by the action of the spring 28. Upon the downward movement of the bar 10 relatively to the casing 2 when the parts are returned to their idle positions, the projections 30 are forced from the recesses 32 and the jaw 24 thus opened, as will be readily understood by reference to Figs. 3 and 4.

The side grippers, including the lining gripper jaws, are connected, in the present construction, with mechanism which serves to withdraw them longitudinally of the shoe in time to avoid interference with the side tacking devices, and subsequently also to return them to starting position. To this end, each of the side grippers carries a rack 34 in engagement with a pinion 36 mounted on a rock shaft 38 in normally fixed relation to the shaft, and rocking movement is imparted to the shaft 38 from a slide 40 operated from the main cam shaft of the machine through connections including a pin 42 on the slide, a plate 44 on the rock shaft, and a link 46 between the pin and the plate. The plate 44 is loosely mounted on the rock shaft to permit the latter to be adjusted relatively to the plate, the adjustment being effected and the shaft and the plate connected in fixed relation by means of an arm 48 pivoted transversely to the end of the shaft and carrying a stud 50 arranged to engage in one or another of a series of holes in the plate. A spring plunger 52 in the rear end of the arm 48 serves to hold the arm with the stud normally in engagement in one of the holes. By the use of this mechanism the grippers may be adjusted relatively to the plate 44 and the operating slide 40 to vary their normal positions for shoes of different sizes or styles.

The link 46 is provided with a slot 54 in which the reduced end of the pin 42 is received, and a spring 56 connected at opposite ends respectively to the link and the pin tends to pull the link rearwardly with reference to the pin and thus effect a turning movement of the shaft 38 such as to withdraw the side grippers toward the rear. Engagement of the pin with the link at the inner end of the slot 54, upon a movement of the slide 40 in one direction, serves to move the grippers back to their normal positions where they are retained by engagement of a spring catch 58 on the plate 44 with a lug 60 carried by one of the side tacker arms 61. The slide 40 is then returned to the position shown in Fig. 2, putting the spring 56 under tension. After the pulling operation, upon the inward movement of the tacker arms, the lug 60 releases the pin 58, and the spring 56 then becomes effective upon the shaft 38 and operates the shaft to withdraw the grippers rearwardly as soon as they have been released by the continued inward movement of the tacker arms. The spring 56 is sufficiently light to avoid any material rearward pull upon the upper in the brief interval between the release of the pin 58 and the release of the grippers. Withdrawal of the grippers out of the path of movement of the side tacking devices is thus effected, and upon the retraction of the tacker arms after the operations upon the shoe have been completed the side grippers are returned to their foremost positions indicated in Fig. 2, as hereinbefore explained. A pin 62 in coöperation with lugs on the plate 44 serves as additional means for limiting movement of the plate and the shaft 38 in either direction. One of the side gripper mechanisms in the construction shown may be adjusted forward or backward relatively to the gripper on the opposite side, if desired, by means of a hand wheel 64 in the manner explained in the earlier patent.

The machine includes a sole rest member 66 adjustably mounted on a carrier 68 which is pivoted at 70 and is rocked in the usual way by a cam 72 against the pressure of a spring 74 in a direction to depress the last while the upper is held by the grippers. Pivoted on the lower side of the carrier 68 are a pair of arms 76 which are normally held by a spring 78 with their front ends in such position as to engage the margin of the sole of a shoe when the shoe is presented in position for the pulling-over operation, and in the case of a turn shoe to extend over that portion of the margin which projects beyond the edge of the last, in order to serve by engagement with the feather of the sole to prevent any substantial upturning of this portion of the sole. The arms 76 thus coöperate with the member 66 to provide a sole rest in the use of which the margin of the sole at the sides will be held in position and will not be turned up through engagement with the upper in the pulling operation of the grippers, the arms being moved downward with the member 66 while the grippers are moving upward. The front ends of the arms 76 are in position to be swung inward by the action of the wipers 80 when the latter are moved in the usual manner to lay the upper over the margin of the sole, with the margin of the upper materials between the arms and the wipers, as illustrated in Fig. 6ª. The arms and the wipers thus assist by their coöperative action in holding the upper after it is released by the grippers and in preventing loss of tension. The arms are retained in the positions to which they are moved by the action of the wipers until after the side grippers have been returned to starting position in the final stage of the operation of the machine in order to prevent the grippers in their downward movement from striking the arms. To this end the arms are arranged to engage frictionally with a spring plate 82 which is secured to the head of the machine and projects under the rear ends of the arms. When the carrier 68 is depressed by the action of the cam 72 the rear ends of the arms are pressed against the plate 82 which is then effective to hold the arms frictionally in the position to which they are moved by the action of the wipers until after the grippers have been returned to starting position. When the carrier is returned to its starting position, a movement which in machines of the illustrative type takes place after the side grippers have been moved downward, pressure of the arms 76 on the plate 82 is relieved and the front ends of the arms are spread apart under the influence of the spring 78.

The member 66, it will be noted, engages the sole at some distance from its front edge in order to oppose no obstruction to the overwiping of the upper and the driving of the tacks. This construction involves the possibility that in the pulling of the upper by the toe gripper 84 the margin of the sole may be upraised from the last, as shown in Fig. 8. In order that this condition, if present, may be readily corrected, the machine is provided with a device for replacing the margin of the sole at the toe in its proper position on the last. This device comprises a presser member 86 shaped to approximate the curve of the end of the sole and of such width as to permit its engagement with the feather of the sole, the member being formed as a portion of a plate 88 which is secured to a slide 90 movable in guideways on the rear of the front gripper casing 92. The presser member 86 is normally upheld by springs 94. Extensions 96 of the plate 88 are provided with handles 98 to enable the operator to depress the member 86 and replace the margin of the sole in its proper position prior to the overwiping and tacking operations.

Pivoted at 100 on each of the side tacker arms 61 is a carrier 102 which is slotted underneath for the reception of the shank of an upper clamping and overlaying member 104. The rear end portion of the member 104 is retained in the slot by means of a pin 106 upon which it rests, while its front end is permitted to yield downwardly, under conditions to be subsequently explained, against the tension of a spring 108 which acts through a pin 110 secured to the member 104 to retain the front end of the member normally in its uppermost position in the slot. The carrier 102 is provided with a slot 112 through which the pin 110 extends, and the construction thus permits relative sliding movement of the carrier and the clamp member lengthwise of the clamp member. The member 104 is normally projected inwardly by means of a spring 114 which is mounted on a rod 116 and bears upon a plate 118 hung on the rod and engaging an upwardly extending arm of the carrier 102, the plate being forked at its lower end for engagement in slots in opposite sides of the member 104. The rod 116 projects from a yoke 120 which is adjustably secured by a bolt and slot connection, as shown, to the tacker arm 61. It will be noted that in this construction the spring 114 has the additional function of swinging the carrier 102 in one direction about its pivot 100, and that the yoke 120, by engagement with the upwardly extending arm of the carrier, determines the normal position of the carrier. By adjusting the yoke the front end of the clamp member 104 may thus be raised or lowered.

The member 104 is so shaped at its front end as to lay the upper materials inward over the margin of the sole and to press them down upon the sole, and is provided also with a lip 122 for pressing the materials against the edge of the sole and the edge of the last. The position of the member is such that it engages the upper approximately at the beginning of the inward movement of the tacker arm before the upper is released by the grippers at which time it may yield backwardly in response to resistance of the upper, and as the arm continues its inward movement the upper materials are overlaid and held with increasing pressure through the action of the spring 114, the pressure being sufficient at the time when the grippers are released to hold the materials from slipping prior to the driving of the tacks. It will be seen by reference to Fig. 7 that as the spring 114 is compressed the plate 118 acts as a lever upon the upwardly projecting arm of the carrier 102 with a constantly increasing tendency to turn the carrier about its pivot, thus causing the clamp member to press the upper materials downward upon the margin of the sole on the bottom of the last while at the same time increasing pressure is applied toward the edge of the sole and the side of the last through the direct action of the plate 118 upon the clamp member.

Danger of breakage of the clamp members 104 through accidental engagement with the grippers is avoided by the provision for downward yielding movement of the front ends of the members against the pressure of the springs 108.

In order to retain the upper materials in position about the toe end of the last after the toe gripper has released its hold and before the materials have been wiped over the sole and tacked, and also to support the last against the action of the tack drivers, the machine is provided with mechanism which is mounted upon rods 124 secured at their upper ends to the front portion of the frame. Brackets 126 fixed to the rods 124 serve to support pivotally a pair of plates 128 to which are secured angular bars 130 having parallel arms 132 bolted together midway between the plates 128, the arms 132 having bolted thereon a block 134 which is bored to receive the shank of a shoe rest member 136. The rest 136 is upheld by a spring 138 positioned in the bore in the block 134 and is retained against displacement by a pin 140 which coöperates with a slot in the shank of the rest. Extending loosely through the block 134 is a rod 142 upon which are pivoted a pair of arms 144, and pivoted on the upper ends of these arms at 145 are blocks 146 to which are secured opposite ends of a flexible band comprising a wire cable 148, this cable extending also loosely through the upper end of an intermediate arm 150 which is pivoted at its lower end to the members 132. The arms 144 are extended downwardly to provide handles 152 and are pivotally connected above the handles at 154 to a connecting member 156. The openings in the arms 144 through which the rod 142 extends are sufficiently large to permit the arms to swing about the pivots 154 which extend at right angles to the axis of movement of the arms about the rod. The rod 142 at its outer end is threaded in a bearing member 158 which engages a curved seat in the outer side of the adjacent arm 144 and thus permits the arm to swing about the pivot 154 while in engagement with the bearing member. Springs 160 between the arms 144 and the block 134 press the arms outward respectively against the member 158 and a head 162 on the rod 142, and turning movement of the rod, by reason of its threaded connection with the member 158, serves to vary the limit of outward movement of the arms or the distance between them. The arms 144, however, by reason of their loose connection with the rod 142, are permitted to swing inwardly about their pivots 154 out of engagement with the member 158 and the head 162.

Depending from the outer ends of the members 132 with provision for limited vertical swinging movement is a curved rack member 164 the teeth of which are engaged by a dog 166 on the connecting member 156 to retain the arms 144 in the position to which they may be moved about the rod 142, the teeth being forwardly inclined as shown in Fig. 1 to assist in retaining the rack member 164 in operative relation to the dog 166. The entire mechanism supported by the plates 128 is lifted by levers 168 which are pivoted on a bracket 170 on the rods 124 and are operated by a handle 169, the levers carrying rolls 172 which engage the lower edges of the plates 128, these edges being shaped at 174 to provide two positions for the mechanism, as indicated respectively by Figs. 1 and 11, wherein the levers 168 in coöperation with the plates 128 will retain the parts in a stationary position. When the levers 168 are swung farther toward the rods 124 than indicated in Fig. 1 the plates 128 and the parts supported thereby may be lowered still farther to permit a shoe to be positioned in the machine or to be removed after the pulling-over operation.

In the use of this mechanism the levers 168 will be operated by means of the handle 169, after the upper has been pulled and the machine has come to a stop, to raise the plates 128 and the parts carried thereby to the position shown in Fig. 1. The spacing of the arms 144 having been adjusted in accordance with the size of the shoe under treatment by turning the rod 142, the arms will then be swung by means of the handles 152 about the rod 142 to carry the cable 148 rearwardly, whereby the cable will engage the upper first at the end of the last and the arms 144 will then be swung inwardly against the pressure of the springs 160 by the pull of the cable to cause the cable to conform substantially to the contour of the last. The rack 164 will then be swung upward to engage the dog 166 and lock the arms in position, the teeth on the rack being held in engagement with the dog by reason of their forward inclination, as shown in Fig. 1, and the tendency for the handles 152 to be swung rearwardly by the resistance of the shoe and the pressure of the springs 160. With the parts in this position, a second operation of the levers 168 by means of the handle 169 will cause the cable and the blocks 146 to wipe over the materials in the direction of the bottom edge of the last, this operation serving to equalize any fullness in the upper materials and, in the case of a turn shoe, to smooth out any wrinkles that there may be in the lining, the cable coming to rest in such position as to hold the materials closely about the last adjacent to its bottom edge ready for the action of the wiping and tacking mechanisms. By the same upward movement of the mechanism the rest 136 is brought into position to support the shoe in the tacking operation. The provision of this mechanism, including the means for holding the upper materials in position and the means for supporting the shoe against the action of the drivers, eliminates the necessity for side clamp arms such as have been usually required heretofore in machines of this general type.

In the operation of the machine, briefly summarized, the shoe is placed in position against the sole rest members 66 and 76, and if the shoe is provided with a tip the lining is turned back from the upper at the toe to reveal the tip seam. The edges of the upper are then inserted in the side grippers and the latches 14 are tripped, either directly by hand or by pressing the sole against the trippers 23, to cause the side grippers to close lightly upon the stock, after which the upper may be adjusted in the grippers to straighten the tip. The edges of the lining are next inserted between the jaws 6 and 24, and both the upper and the lining are positioned in the toe gripper. The clutch is then tripped to effect the updraw movement of the grippers and the depression of the sole rest, including the arms 76, which are effective at this stage to hold the edges of the sole in position close to the last. During this updraw movement the jaws 24 close upon the lining, the closing of these jaws taking place as the cams 30 enter the recesses 32 shortly after the beginning of the updraw movement of the jaws 4 and 6, and the lining is pulled at the sides to cause it to lie smoothly against the upper as the latter is drawn into position. It will be apparent that by reason of the sequence in the closure of the grippers upon the upper and the lining respectively, as well as the construction of the smooth gripper jaws 24 which permit the lining to slip more readily than the upper, the lining will be tensioned slightly less than the upper, which is of advantage in view of the relatively greater tendency of the lining to tear.

While the machine is at rest at the end of the updraw movement the member 86 may be operated to replace the toe end of the sole in its proper position, in case this portion of the sole has been lifted in the upper pulling operation. The mechanism for holding the upper materials closely about the toe end of the last, including the shoe supporting member 136, is then manipulated in the manner hereinbefore explained and positioned as shown in Fig. 11, after which the toe gripper is released and the wipers 80 are moved by hand into engagement with the upper materials. Upon a second actuation of the clutch to effect the final stage of the cycle of operations, the wipers and the tacker arms are moved inward, the sole retaining members 76 yielding to the action of the wipers and the members 104 being moved inward to overlay and hold portions of the upper at the rear of the wipers in position for tacking. In consequence of this inward movement of the tacker arms the pin 58 is released, rendering the spring 56 effective with a relatively light rearward pull upon the side grippers. During the continued inward movement of the tacker arms the side grippers, by the tripping of the latches 14, are caused to release their hold upon the stock, and the lining also slips from between its gripper jaws in consequence of the upward spring of the grippers when the latches are tripped, whereupon the grippers are immediately moved to the rear out of the path of movement of the arms through the action of the spring 56. At the end of the inward movement of the side tackers, determined by their engagement with the blocks 146, the tacks are driven at the sides, and also simultaneously at the toe by means of the front tacking devices. The power operated portions of the machine then return to their starting positions, leaving the shoe engaged by the retaining mechanism shown in Fig. 11 which is then manipulated to release the shoe and permit its removal from the machine.

The term "upper" as used herein is to be understood as inclusive of the lining of the shoe except where the context requires a limitation of the term to exclude the lining.

Having described the invention, what I claim as new and desire to secure by Letters Patent of the United States is:

1. A machine of the class described having, in combination, side grippers movable to pull an upper over a last and movable also lengthwise of the last, and means automatically operative to present said grippers normally in an upper receiving position relatively near the toe end of the last and to move them toward the heel end of the last after the upper pulling operation.

2. A machine of the class described having, in combination, side grippers movable to pull an upper over a last and connected for movement together in the same direction to different positions lengthwise of the last, and means automatically operative during the cycle of operations of the machine for presenting said grippers finally in a position relatively near the toe end of the last for the reception of an upper.

3. A machine of the class described having, in combination, side grippers movable to pull an upper over a last and movable also lengthwise of the last, and means automatically operative to move said grippers rearwardly toward the heel end of the last after the upper pulling operation and then to return them to their foremost position for the reception of the upper of another shoe.

4. A machine of the class described having, in combination, side grippers movable to pull an upper over a last and movable also lengthwise of the last, spring means for moving said grippers toward the heel end of the last after the upper pulling operation, and power operated means for returning the grippers to their foremost position.

5. A machine of the class described having, in combination, side grippers movable to pull an upper over a last and movable also lengthwise of the last, fastener driving instrumentalities, means for moving said grippers to their foremost position in the final stage of the cycle of operations of the machine, and means associated with said fastener driving instrumentalities for retaining the grippers normally in said foremost position and for releasing them to permit them to be retracted out of the path of movement of said instrumentalities prior to the fastener driving operation.

6. A pulling-over machine having, in combiantion, shoe positioning means, upper holding and fastening mechanism, upper pulling grippers, and operating means constructed and arranged to cause the grippers to seize and pull the upper and retain it while said mechanism comes into upper holding relation to the shoe and then automatically to cause the grippers to retreat toward the heel end of the shoe prior to the upper fastening operation to make room for said mechanism to move transversely over the shoe bottom to upper fastening position.

7. A pulling-over machine having, in combination, shoe positioning means, side grippers, mechanism for relatively moving the last and the side grippers to pull the upper, and means constructed and arranged to move the grippers automatically in one direction lengthwise of the last after they release the upper and then in the opposite direction to return them to work receiving position.

8. A pulling-over machine having, in combination, grippers for engaging an upper at opposite sides of a last, means for relatively moving the last and said grippers to cause the grippers to pull the upper over the last, upper fastening mechanism movable transversely of the last to fastener inserting position, and means for moving said grippers lengthwise of the last after the upper pulling operation to withdraw them from the path of movement of the upper fastening mechanism.

9. A machine of the class described having, in combination, side grippers movable to pull an upper over a last and movable also to different positions lengthwise of the last, an operating member and connections between said member and the grippers for moving the grippers to their foremost position, means for retaining the grippers in said position, said connections including parts relatively movable to permit the operating member to return to its starting position without moving the grippers, and a spring for moving the grippers reversely upon their release by said retaining means.

10. A machine of the class described having, in combination, side grippers movable to pull an upper over a last and movable also to different positions lengthwise of the last, an operating member and means connecting said member to the grippers including a pin and slot connection whereby the grippers may be moved to their foremost position by said member and the member may be returned to starting position without moving the grippers, means for retaining the grippers normally in said foremost position, and a spring arranged to be tensioned by the return movement of said member and to effect a reverse movement of the grippers upon their release by said retaining means.

11. A machine for pulling over shoe materials comprising an upper and a lining having, in combination, a gripper constructed to permit its closure upon the upper at the side of a shoe, and means constructed and arranged to effect gripping engagement with the lining at the side of the shoe after said gripper has closed upon the upper.

12. A machine for pulling over shoe materials comprising an upper and a lining having, in combination, a gripper for engaging the upper constructed to permit its initial closure under a tension permitting adjustment of the upper relatively thereto, and means for gripping the lining after the upper has been so adjusted.

13. A machine for pulling over shoe materials comprising an upper and a lining having, in combination, a side gripper for engaging the upper constructed to permit its closure upon the upper while the lining is turned back in such manner as to reveal the tip seam and facilitate adjustment of the upper, and means for subsequently gripping the lining at the side of the shoe to cause the lining to be pulled together with the upper.

14. A machine for pulling over shoe materials comprising an upper and a lining having, in combination, means for gripping the upper at the side of the shoe, mechanism for operating said gripping means to pull the upper, and means controlled by the movement of said upper gripping means for gripping and pulling the lining at the side of the shoe after the upper has been gripped.

15. A machine for pulling over shoe materials comprising an upper and a lining having, in combination, a gripper for engaging the upper constructed to permit its initial closure upon the upper when a shoe is presented to the machine and before the machine is started, mechanism for operating said gripper to pull the upper, and means for gripping the lining at the side of the shoe, said means being constructed and arranged to be closed upon the lining through the operative movement of said mechanism after said gripper has closed upon the upper.

16. A machine for pulling over shoe materials comprising an upper and a lining having, in combination, means for gripping the upper and the lining separately, said means being constructed and arranged to permit the upper to be gripped prior to gripping engagement with the lining.

17. A machine for pulling over shoe materials comprising an upper and a lining having, in combination, means for gripping the upper separately from the lining, additional means for gripping the lining, and operating mechanism constructed and arranged to cause said means to grip the upper and the lining successively.

18. A machine for pulling over shoe materials comprising an upper and a lining having, in combination, means for gripping the upper, additional means for gripping the lining, and operating mechanism organized to cause said means to grip and pull the upper and then to grip the lining and pull the upper and lining together.

19. A machine for pulling over turn shoe materials comprising an upper and a lining having, in combination, a pair of gripper jaws for gripping and pulling the upper, and a third gripper jaw separately controlled with respect to closing movement and arranged to coöperate with the outer jaw of said pair to grip and pull the lining on the outside of the upper.

20. A machine for pulling over shoe materials comprising an upper and a lining having, in combination, means for pulling the upper comprising a fixed gripper jaw and a pivoted gripper jaw, and a third gripper jaw coöperating with said pivoted jaw to grip and pull the lining and arranged to be closed on the lining after the upper has been gripped between its jaws.

21. A machine for pulling over shoe materials comprising an upper and a lining having, in combination, a pair of jaws for gripping the upper, means for operating said jaws to pull the upper, a third jaw arranged to coöperate with one of the jaws of said pair to grip and pull the lining, and means for causing said third jaw to close upon the lining after the pair of jaws have closed upon the upper.

22. A machine for pulling over shoe materials comprising an upper and a lining having, in combination, a pair of jaws for gripping the upper, means for operating said jaws to pull the upper, a third jaw arranged to coöperate with one of the jaws of said pair to grip and pull the lining, and means controlled by the pulling movement of said operating means for causing the third jaw to close upon the lining after the pair of jaws have closed upon the upper.

23. A machine for pulling over shoe materials comprising an upper and a lining having, in combination, a pair of gripper jaws for gripping the upper at the side of the shoe, mechanism for operating said jaws to pull the upper, a third jaw arranged to coöperate with one of the jaws of said pair to grip and pull the lining, a spring tending to maintain said third jaw in closed position, and cam means between said operating mechanism and third jaw for controlling the closing movement of said jaw and for opening the jaw against the action of said spring.

24. A machine for pulling over shoe materials comprising an upper and a lining having, in combination, a pair of gripper jaws for gripping the upper at the side of the shoe, mechanism for operating said jaws to pull the upper comprising a bar having a limited range of movement relative to the jaws, a third jaw arranged to coöperate with one of the jaws of said pair to grip and pull the lining, a spring tending to maintain said third jaw in closed position, and means operative through said limited movement of the bar for opening said third jaw and for controlling its closing movement.

25. A machine for pulling over shoe materials comprising an upper and a lining having, in combination, a pair of gripper jaws for gripping the upper at the side of the shoe, a casing upon which said jaws are mounted, mechanism for operating said jaws and the casing to pull the upper comprising a bar having a limited range of movement relative to the casing, a third jaw carried by the casing and arranged to coöperate with one of the jaws of said pair to grip and pull the lining, a spring tending to maintain said third jaw in closed position, and cam means between said third jaw and the operating bar for opening said jaw against the action of said spring and for controlling its closing movement.

26. In a machine of the class described, the combination with upper pulling means for pulling an upper at opposite sides of the forepart, of means for engaging the sole of the shoe adjacent to its side edge to retain it in position during the upper pulling operation, said sole engaging means being movable inwardly from the edge of the sole in a plane substantially parallel to the plane of the sole, and yielding means tending to position said sole engaging means adjacent to the edge of the sole.

27. In a machine of the class described, the combination with upper pulling means having an updrawing movement and upper fastening means movable inwardly over the margin of the sole to fastener inserting position, of means for engaging the sole adjacent to its edge to hold the margin of the sole in position during the updraw movement of the pulling means, the machine being constructed to cause said sole engaging means to move inwardly from the edge of the sole in advance of the fastening means.

28. In a pulling-over machine, the combination with upper pulling means for the toe end and the opposite sides of the forepart of a shoe, and end embracing wipers for laying the upper over the margin of the sole, of means for engaging the margin of the sole to hold it in position in the upper pulling operation, said sole engaging means comprising a member arranged to be moved inwardly from the margin in advance of the wipers to permit the operation of the wipers.

29. In a turn shoe pulling-over machine, the combination with upper pulling means and means for laying the upper over the margin of the sole, of a member for engaging the marginal portion of the sole to hold it in position during the upper pulling operation, and means for positioning said member normally over a portion of the sole which projects beyond the edge of the last while permitting the member to be moved inwardly from said edge portion through the operation of said overlaying means.

30. In a turn shoe pulling-over machine, the combination with upper pulling means and means for laying the upper over the margin of the sole, of a pair of members arranged to engage the marginal portion of the sole at opposite sides of the forepart to hold the sole in position during the upper pulling operation, and means for positioning said members normally over a portion of the margin which projects beyond the edge of the last while permitting them to be moved inwardly over the sole by the pressure of the overlaying means.

31. In a machine of the class described, the combination with upper pulling means comprising toe and side grippers, of a pair of arms extending substantially parallel to the sole and normally positioned to engage the sole adjacent to its side edges to retain it in position during the upper pulling operation, said arms being yieldable inwardly from the edges of the sole.

32. A machine of the class described having, in combination, upper pulling means comprising toe and side grippers, and a pair of arms for engaging the sole adjacent to its side edges to retain it in position during the upper pulling operation, said arms being pivotally mounted for swinging movement inwardly from the edge of the sole, and yielding means for positioning said arms normally at their outer limits of movement.

33. In a machine of the class described, the combination with upper pulling means for the sides of the forepart of a shoe and wipers for laying the upper over the margin of the sole, of a sole rest comprising a pair of arms extending outwardly at opposite sides and pivoted for swinging movement toward or from the side edges of the sole, and means for positioning said arms normally at their outer limits of movement while permitting them to yield inwardly under the pressure of the upper materials when the wipers close inwardly over the margin of the sole.

34. In a machine of the class described, the combination with side grippers and mechanism for operating said grippers to pull and to overdraw the upper, of a member for engaging the sole adjacent to its edge to retain it in position during the upper pulling operation, said member being mounted for movement inwardly from the sole edge as the upper is forced over the margin of the sole, and means for retaining said member temporarily in its inner position to permit the grippers to return to starting position without striking the member.

35. In a machine of the class described, the combination with side grippers and mechanism for operating said grippers to pull an upper of a sole rest comprising a pair of arms extending outwardly at opposite sides and mounted for movement inwardly from the side edges of the sole through engagement with the upper, yielding means for maintaining said arms normally with their outer ends in position to engage the sole adjacent to its edge, and means for engaging the arms frictionally to retain them in the positions to which they are moved by the upper while the grippers are returned to their starting positions.

36. In a machine of the class described, the combination with upper pulling means comprising grippers movable in one direction to pull an upper and in the opposite direction to starting position, of a sole rest comprising a pair of arms extending outwardly for engagement with opposite side portions of the sole and movable inwardly from the sides of the sole through engagement with the upper, yielding means for positioning said arms normally with their outer ends adjacent to the grippers, and means for retaining the arms in the position to which they are moved by the upper until after the grippers have returned substantially to starting position.

37. In a machine of the class described, the combination with upper pulling means, of a sole rest pivoted to swing in directions toward or from the shoe, said rest having arms pivoted thereon and yielding means for maintaining said arms normally with their outer ends in position to engage the sole adjacent to its side edges while permitting the arms to be swung inwardly by engagement with the upper, and means positioned to engage said arms when the sole rest is swung toward the shoe for retaining the arms in the position to which they are moved by engagement with the upper.

38. In a machine of the class described, the combination with upper pulling means, of a sole rest pivoted to swing in directions toward or from the shoe, said rest having arms pivoted thereon and yielding means for maintaining said arms normally with their outer ends in position to engage the sole adjacent to its side edges while permitting the arms to be swung inwardly by engagement with the upper, and a spring plate positioned to engage the rear ends of said arms frictionally when the sole rest is swung toward the shoe for restraining the arms from swinging outward.

39. In a pulling-over machine, the combination with means for pulling an upper up the side of a last and for laying it over the margin of the shoe sole, of a member constructed and arranged for engagement with the margin of the sole in the path of upper fastening means, of means for engaging the upper to retain it in position in the interval between the pulling and the fastening operations, said upper engaging means comprising a clamp member having portions shaped for engagement with the upper over the margin of the face of the sole and opposite to the edge of the sole respectively, a carrier for said member pivoted for movement in a direction to force said member down upon the upper on the margin of the face of the sole, and spring means tending to swing the carrier in said direction and also to move the clamp member in a direction toward the edge of the sole.

53. In a machine of the class described, the combination with upper pulling means, of upper holding means movable toward or from the side of the shoe, said holding means comprising a clamp member shaped to press the upper upon the margin of the face of the sole and against the edge of the sole, a carrier on which said member is mounted, the carrier being movable relatively to the clamp member after said member has engaged the shoe, and a spring operative in said relative movement of the carrier for progressively increasing the pressure of said member upon the upper both on the margin and against the edge of the sole.

54. In a machine of the class described, the combination with upper pulling means, of upper holding means movable toward or from the shoe, said holding means comprising a clamp member shaped to press the upper upon the margin of the face of the sole and against the edge of the sole, a carrier on which said member is mounted, said carrier being pivoted for movement to cause the clamp member to press the upper upon the margin of the sole and movable also relatively to said member in a direction toward the side of the shoe, a spring arranged to be tensioned in said relative movement of the carrier, and connections between said spring and both the clamp member and the carrier to render said spring effective with a tendency both to swing the carrier and to move the clamp member toward the edge of the sole.

55. In a machine of the class described, upper holding means comprising a support movable toward or from the side of the shoe, a carrier pivoted on said support for movement about an axis transverse to the direction of movement of the support, a clamp member mounted on said carrier with provision for relative movement of the member and the carrier in directions toward or from the side of the shoe, said member being shaped to engage the upper over the margin of the face of the sole and opposite to the edge of the sole, a spring carried by said support, and means for rendering said spring effective upon both the carrier and the clamp member to cause said member to press the upper upon the margin of the face of the sole and against the edge of the sole upon a movement of the support toward the shoe.

56. In a machine of the class described, upper holding means comprising a support movable toward or from the side of the shoe, a carrier pivoted on said support for movment about an axis transverse to the direction of movement of the support and having a portion extending inwardly from said axis toward the shoe, a clamp member mounted on said inwardly extending portion, and means for adjustably limiting movement of said carrier about its axis to vary the position of the clamp member in relation to the plane of the shoe bottom.

57. In a machine of the class described, upper holding means comprising a support movable toward or from the side of the shoe, a carrier pivoted on said support for movement about an axis transverse to the direction of movement of the support and having a portion extending inwardly from said axis toward the shoe and an arm extending at an angle to said inwardly extending portion, a clamp member mounted on said inwardly extending portion of the carrier, and a stop on said support arranged to engage said arm to determine the limit of movement of the carrier in one direction about its axis, said stop being adjustable to vary the position of the clamp member in relation to the plane of the shoe bottom.

58. In a machine of the class described, the combination with upper pulling means, of a side tacker arm movable inwardly to tack inserting position, a clamp member slidingly mounted on said arm to permit it to be stopped by engagement with the upper while the arm continues its inward movement, said member having portions shaped respectively for pressing the upper simultaneously upon the margin of the face of the sole and against the edge of the sole, and means operative through said continued inward movement of the arm to cause the clamp member to press the upper in both said directions.

59. In a machine of the class described, the combination with means for pulling an upper into position at the toe of a last, of means for engaging the upper on the lateral surface of the last around the toe to retain the upper in position, said means comprising a flexible band conformable automatically to the shape of the lateral surface of the last, and operating means for the band comprising a plurality of arms arranged to support the band at the end and at the sides of the shoe and to pull upon the band to wrap it around the shoe.

movement of said means when the shoe is presented to the machine to position the sole with reference to the last, said member being mounted for movement yieldingly inward from over the feather of the sole in advance of said means to permit the upper to be carried over the feather.

40. In a turn shoe pulling-over machine, the combination with means for pulling an upper up the side of a last and for laying it over the margin of the sole of the shoe, of a member constructed and arranged to extend in the path of movement of said means over a portion of the margin of the sole that projects beyond the edge of the last to position the sole in correct relation to the last, the machine being constructed and arranged to cause said member to be withdrawn from said projecting portion of the sole to permit the upper to be laid over the margin of the sole.

41. In a machine of the class described, the combination with upper pulling means and overlaying means, of means mounted for movement into engagement with the marginal portion of the sole in a direction transverse to the plane of the sole subsequent to the upper pulling operation to replace said portion of the sole in its correct position with reference to the last.

42. In a pulling-over machine, the combination with upper pulling means and overlaying means, of means for engaging the sole adjacent to its outer edge, said sole engaging means being constructed and arranged for manual movement subsequent to the upper pulling operation to replace the margin of the sole in its correct position with reference to the last.

43. In a pulling-over machine, the combination with upper pulling means and overlaying means, of a sole positioning member, and spring means for maintaining said member normally out of engagement with the sole while permitting it to be moved into sole engaging position.

44. In a pulling-over machine, the combination with means for pulling a shoe upper at the toe of a last, of a member shaped to engage the margin of the sole around the toe end of the sole, said member being constructed and arranged for movement subsequent to the upper pulling operation to replace the margin of the sole in its correct position with reference to the last.

45. In a machine of the class described, the combination with a gripper for engaging and pulling a shoe upper, of means carried by the gripper and movable relatively to the gripper after the upper pulling operation in a direction to depress the feather of the sole of the shoe.

46. In a machine of the class described, the combination with a gripper for engaging and pulling a shoe upper, of a device movably mounted on the gripper at the inner side thereof for pressing the margin of the sole down while the gripper is applying tension to the upper.

47. In a machine of the class described, the combination with a gripper for engaging and pulling a shoe upper, of means supported on the gripper at the inner side thereof for pressing the margin of the sole down while the gripper is applying tension to the upper, said means being movable relatively to the gripper while the gripper holds the upper into position to permit the gripper to carry the upper over the margin of the sole.

48. In a machine of the class described, the combination with a gripper for engaging and pulling the upper at the toe of a shoe comprising upper engaging jaws and a gripper casing, of a member movable along said casing into or out of position to press upon the margin of the toe end of the sole, and spring means for maintaining said member normally out of engagement with the sole while permitting it to be moved into sole engaging position.

49. In a machine of the class described, the combination with upper pulling means and means for wiping the upper over the margin of the sole at the toe, of a sole rest arranged to engage the sole at such a distance from the margin of the toe end of the sole as to permit the operation of said wiping means, and a sole engaging member movable after the upper pulling operation to insure a correct position of the margin of the sole in front of said rest.

50. In a machine of the class described, the combination with upper pulling and fastener inserting means, of means for engaging the upper to retain it in position in the interval between the pulling and the fastener inserting operations, said upper engaging means comprising a slidingly mounted clamp member constructed to press the upper upon the margin of the face of the sole, said member being provided also with a lip for pressing the upper against the edge of the sole.

51. In a machine of the class described, the combination with upper pulling and upper fastening means, of means for engaging the upper to retain it in position in the interval between the pulling and the fastening operations, said upper engaging means comprising a clamp member having portions relatively disposed for simultaneous engagement with the upper over the margin of the face of the sole and opposite to the edge of the sole respectively, and a spring tending to move said member in two directions to render both said portions effective to clamp the upper.

52. In a machine of the class described, the combination with upper pulling and

60. In a machine of the class described, the combination with means for pulling an upper over a last and means for wiping the margin of the upper into lasted position around the toe, of means for engaging the pulled upper to retain it in position for said over-wiping operation, said retaining means comprising a flexible member conformable substantially to the shape of the lateral surface of the last, and means for forcing said member into engagement with the upper between the edge of the last bottom and the top of the forepart of the shoe in position to permit the operation of said over-wiping means.

61. In a machine of the class described, the combination with means for pulling an upper into position at the toe of a last, and means for wiping the margin of the upper over the sole, of means comprising a flexible band manually movable independently of the wiping means into engagement with the upper materials on the lateral surface of the last around the toe to retain the upper in position for the over-wiping operation.

62. In a machine of the class described, the combination with upper pulling and upper fastening means, of means manually movable into position to clamp the upper against the toe end of the last to permit the upper to be released by the pulling means before it is fastened in position, said clamping means comprising a flexible upper engaging member and means for conforming said member to the shape of the shoe through the movement of said member into upper engaging position.

63. In a machine of the class described, the combination with means for pulling an upper over a last and means for lasting the toe portion of the shoe, of a device for engaging and retaining upper materials in pulled-over position at the toe end of the last, said device being movable rearwardly into engagement with the upper at the toe and comprising a flexible upper engaging member, and means for controlling the position of said member to cause it to be wrapped about the toe through the rearward movement of said device.

64. In a machine of the class described, the combination with means for pulling an upper over a last and means for lasting the toe portion of the shoe, of a device for engaging and retaining upper materials in pulled-over position at the toe of the last, said device being movable rearwardly into engagement with the upper at the toe and comprising a flexible upper engaging member, and arms at opposite sides of the shoe to which the ends of said member are connected, said arms being yieldingly movable toward the shoe in response to the pull of said member in the rearward movement of said device.

65. In a machine of the class described, the combination with means for pulling an upper over a last and means for lasting the toe portion of the shoe, of a device for engaging and retaining the upper materials in pulled-over position at the toe end of the last, said device being movable rearwardly into engagement with the upper at the toe and comprising a flexible upper engaging member, arms at opposite sides of the shoe to which the ends of said member are secured, said arms being pivoted for movement toward or from the sides of the shoe, and spring means for retaining the arms normally at their outer limits of movement while permitting them to swing toward the shoe in response to the pull of said member in the rearward movement of the device.

66. In a machine of the class described, a device for engaging and retaining upper materials in position at the toe end of a last, said device being movable rearwardly into engagement with the upper at the toe and comprising a flexible upper engaging member, arms at opposite sides of the shoe to which the ends of said member are secured, said arms being movable toward the shoe in response to the pull of said member in the rearward movement of said device, means for normally retaining the arms in their outermost position, and means for adjusting the limits of outward movement of the arms for different sizes of shoes.

67. In a machine of the class described, the combination with a toe gripper and means for operating said gripper to pull an upper into position on a last, of a flexible clamping device pivoted for swinging movement into engagement with the upper around the toe end of the last to hold the upper in position, and means for locking said device in its upper holding position to permit the upper to be released by the gripper.

68. In a machine of the class described, the combination with a toe gripper, means for operating said gripper to pull an upper, and wipers movable to lay the margin of the upper over the sole, of means manually movable independently of the wipers into position to clamp the upper against the toe end of the last to permit the upper to be released by the gripper, said clamping means being arranged to engage the upper in a position between the edge of the sole and the top of the forepart of the shoe to permit the closing movement of the wipers.

69. In a machine of the class described, the combination with upper pulling and upper fastening means, of an upper engaging device supported independently of the fastening means and conformable substantially to the shape of the shoe about the toe, means for moving said device in wiping engagement with the upper materials in the direction of the edge of the sole while the upper materials are held by the pulling means, and means for locking said device in position to hold the materials for the fastening operation.

70. In a machine of the class described, the combination with upper pulling means and upper fastening mechanism, of means for engaging the upper materials to hold them in position to be operated upon by said mechanism, said upper engaging means being supported independently of said mechanism and movable over the materials in the direction of the bottom edge of the last to a holding position in such relation to said edge as to permit the operation of said mechanism.

71. In a machine of the class described, the combination with upper pulling and upper fastening means, of a device for smoothing the upper materials about the toe of the last and holding them in position to be fastened, said device being movable first to a position relatively remote from the shoe bottom to permit it to be adjusted in engagement with the shoe and movable subsequently toward the bottom of the shoe to smooth the upper materials over the last.

72. In a machine of the class described, the combination with upper pulling and upper fastening means, of an upper holding device movable in wiping engagement with the upper materials at the toe end of the shoe in the direction of the edge of the sole into position to hold the materials for the fastening operation, said device comprising a flexible clamping member conformable substantially to the shape of the shoe and a support upon which said member is mounted, and means for moving said support initially to a position to permit said member to be adjusted in engagement with the upper materials and for moving it subsequently to carry said member toward the bottom of the shoe in engagement with the upper materials.

73. In a machine of the class described, the combination with upper pulling and upper fastening means, of an upper holding device movable in wiping engagement with the upper materials at the toe of the shoe in the direction of the edge of the sole into position to hold the materials for the fastening operation, said device comprising a flexible clamping member conformable substantially to the shape of the shoe and a support on which said member is mounted, and means for retaining said support initially in a position to permit said member to be adjusted in engagement with the upper materials and for subsequently moving the support to carry said member toward the bottom of the shoe and then retaining the support with the member in upper holding position.

74. In a turn shoe pulling-over machine, the combination with means for pulling an upper over the forepart of a last, of means movable in wiping engagement with the lining at the forepart of the last in the direction of the bottom of the last, and mechanism for operating said wiping means constructed to position said means normally under the shoe while permitting said means to be moved initially upward toward the shoe prior to its operative movement.

75. In a turn shoe pulling-over machine, the combination with means for pulling an upper over the forepart of a last, of means movable in wiping engagement with the lining at the forepart of the last in the direction of the bottom of the last, and mechanism for positioning said wiping means normally remote from the shoe materials while permitting it to be locked in engagement with the materials prior to its operative movement.

76. In a machine of the class described, the combination with upper pulling and upper fastening means, of an upper holding device manually movable into engagement with the upper materials about the toe end of the last to retain the materials in position after the pulling operation, and means movable with said device into position to support the shoe by engagement with the upper materials over the top of the forepart of the last.

77. In a machine of the class described, the combination with upper pulling and upper fastening means, of an upper holding device comprising a flexible member conformable substantially to the shape of the last about the toe and movable into holding engagement with the materials, and a shoe rest movable with said device into position to support the shoe by engagement with the upper materials over the top of the forepart of the last.

78. In a machine of the class described, the combination with upper pulling and upper fastening means, of an upper holding device comprising a member arranged for engagement with the upper materials on the lateral surface of the last and movable in wiping engagement with the materials in the direction of the bottom edge of the last to holding position, a shoe rest member movable with said device into position to support the shoe by engagement with the upper materials over the top of the forepart of the last, and means for yieldably supporting said rest member to permit the upper holding member to move relatively to the rest member during movement of said device to holding position.

79. In a pulling-over machine, the combination with upper and last positioning means, of grippers for engaging the upper at opposite sides of the last and pulling it over the last, and means for presenting said grippers initially in an upper receiving position relatively near the toe end of the last, the machine being constructed to move said grippers toward the heel end of the last after the upper pulling operation and then to return them to their initial position.

80. In a pulling-over machine, the combination with upper and last positioning means, of grippers for engaging the upper at opposite sides of the last and pulling it over the last, means for presenting said grippers initially in an upper receiving position relatively near the toe end of the last, and means for fastening the upper in pulled over position, the machine being constructed to move said grippers toward the heel end of the last between the upper pulling and upper fastening operations to make way for the operation of the fastening means and to return them to their initial position after the upper fastening operation.

81. A machine for pulling over shoe materials comprising an upper and a lining having, in combination, a gripper constructed and arranged to be closed upon the upper separately from the lining, and means constructed to effect gripping engagement with the lining after said gripper has closed upon the upper.

82. A machine for pulling over shoe materials comprising an upper and a lining having, in combination, means for gripping the upper and the lining separately in substantially the same locations lengthwise of the edge of the work, and mechanism for operating said gripping means to cause the upper to be gripped first and then the lining and to pull both the upper and the lining.

83. A machine for pulling over shoe materials comprising an upper and a lining having, in combination, means for gripping the upper and the lining separately in substantially the same locations lengthwise of the edge of the work, and mechanism for operating said gripping means to grip and pull the upper and then to grip the lining and pull it during the continued movement of said mechanism to pull the upper.

84. A machine for pulling over shoe materials comprising an upper and a lining having, in combination, an upper engaging gripper constructed and arranged to be closed upon the upper initially with such force as to permit adjustment of the upper relatively to the gripper, a lining gripper, mechanism for operating said upper engaging gripper to pull the upper, and means constructed and arranged to be rendered operative by the movement of the upper engaging gripper to cause the lining gripper to close upon and pull the lining.

85. A machine for pulling over a last the upper and the lining of a turn shoe having, in combination, an upper engaging gripper constructed and arranged to be closed upon the upper next to the last while the lining is free to be turned back away from the upper, a gripper arranged to be closed subsequently upon the lining, and means for operating said grippers to pull the upper and the lining.

86. A machine for pulling over a last the upper and the lining of a turn shoe having, in combination, an upper engaging gripper constructed and arranged to be closed upon the upper next to the last while the lining is free to be turned back away from the upper, a lining gripper, and means for operating said grippers to cause the lining gripper to close upon the work after the upper gripper has closed and to cause said grippers to pull the different respective portions of the work with different degrees of tension.

87. In a machine of the class described, the combination with means for pulling an upper over a last, of a clamp member for holding the upper in position on the last, said member having a portion constructed to press the upper down upon the margin of the sole on the bottom of the last and another portion constructed to press the upper inwardly toward the edge of the sole, and a support upon which said member is slidingly mounted to yield backwardly from the shoe in response to resistance of the shoe materials.

88. In a machine of the class described, the combination with upper pulling means, of upper holding means comprising a support movable toward and from the shoe, a clamping device comprising a carrier pivoted on said support for movement about an axis transverse to the direction of movement of the support and a shoe engaging member movably mounted on said carrier, and yielding means tending to swing the device about said axis in a direction to press the upper down upon the margin of the sole of the shoe while permitting it to yield against the resistance of the shoe materials.

89. In a machine of the class described, the combination with upper pulling means, of upper holding means comprising a support movable toward and from the shoe, a carrier pivoted on said support for movement about an axis transverse to the direction of movement of the support, a clamp member mounted on said carrier to swing with the carrier yieldingly against resistance of the materials on the margin of the shoe bottom and to yield backwardly relatively to the carrier against the resistance of the materials at the side of the shoe, and yielding means tending to resist the swinging of the carrier and the backward yield of said member.

90. In a machine of the class described, a clamp member 104, a carrier 102 on which said member is mounted, a plate 118 arranged to operate said member and carrier, and a spring 114 tending to move said plate in a direction to swing the carrier and to move the clamp member relatively to the carrier.

91. In a machine of the class described, the combination with means for pulling an upper over a last and means for laying the margin of the upper over the bottom of the last, of a device mounted independently of said overlaying means and movable in wiping engagement with the upper materials about the end of the last in a direction transverse to the plane of the bottom of the last into position to hold the materials for the overlaying operation.

92. In a machine of the class described, the combination with means for pulling an upper over a last and means for laying the margin of the upper over the bottom of the last, of a device movable in wiping engagement with the upper materials about the end of the last in the direction of the bottom of the last into position to hold the materials for the overlaying operation, said device comprising a flexible member conformable substantially to the shape of the shoe.

93. In a turn shoe pulling-over machine, the combination with means for pulling an upper over the forepart of a last and means for laying the margin of the upper over the sole of the shoe, of means constructed and arranged to engage the lining over the lateral surface of the last, said means being mounted for movement over the lining independently of the overlaying means in a direction transverse to the plane of the bottom of the last to conform the lining to the contour of the upper.

94. In a turn shoe pulling-over machine, the combination with means for pulling an upper over the forepart of a last and for holding it under tension, of a member constructed and arranged to engage the lining on the outside of the upper, said member being mounted for movement over the surface of the last in wiping engagement with the lining in a direction transverse to the plane of the shoe bottom while the upper is held by the pulling means and arranged to clamp the upper materials against the lateral periphery of the last after said wiping movement has been completed.

95. In a turn shoe pulling-over machine, the combination with means for pulling an upper over a last and means for laying the upper materials over the margin of the bottom of the last, of means mounted independently of said overlaying means for engaging the lining between the bottom edge and the top of the shoe, said means being movable in wiping engagement with a lining in the direction toward the bottom edge of the last into position to hold the lining for the overlaying operation.

96. In a pulling-over machine, the combination with means for positioning a last and an upper, of means for pulling the upper over the last, means for engaging the margin of the sole of the shoe at the opposite sides of the sole to position it on the last, and mechanism for operating said upper pulling means and margin engaging means in time relation to cause them to move in substantially opposite directions to perform their functions, the machine being constructed to cause said margin engaging means to be withdrawn from operative position while the shoe remains in operative relation to said positioning means.

97. In a pulling-over machine, the combination with means for pulling an upper over a last, of means for engaging the margin of the sole of the shoe at the opposite sides of the sole to position it on the last, and means operative during the upper pulling movement of said pulling means to cause said margin engaging means to move in a direction toward the last to press the margin of the sole down upon the last, the machine being constructed to cause said margin engaging means to be moved subsequently inward over the sole to withdraw it from operative position.

98. In a pulling-over machine, the combination with means for pulling an upper over a last at the toe and at opposite sides of the forepart, means for laying the upper over the margin of a sole on the last and means for fastening the upper to the sole, of means for engaging the margin of the sole to prevent it from being uplifted from the last during the upper pulling operation, the machine having means for causing said margin engaging means to be moved out of operative position to permit the operation of the fastening means.

99. In a pulling-over machine, the combination with upper pulling means and operating mechanism constructed and arranged to cause the upper to be pulled and then held under tension with the machine at rest, of means for engaging the margin of the sole of the shoe to position it in the correct relation to the last, and means movable over the margin of the sole when the machine is again started for fastening the upper in pulled-over position, the machine being constructed to cause said margin engaging means to be withdrawn from operative position in advance of the operation of the fastening means.

100. In a pulling-over machine, the combination with means for pulling an upper over a last at the toe and at opposite sides of the forepart and means for laying the upper over the margin of the sole of the shoe, of a pair of members arranged to extend outwardly toward the sides of the shoe with their outer ends in position to engage the margin of the sole at opposite sides of the forepart, said members being pivoted to swing inwardly in advance of said overlaying means, and spring means tending to force said members outwardly.

101. In a pulling-over machine, the combination with grippers for pulling an upper over a last at the sides of the forepart and means movable inwardly to lay the upper over the margin of the sole of the shoe, of members arranged to extend in substantially parallel relation to the plane of the sole for holding the margin of the sole at the sides of the shoe in position during the upper pulling operation, said members being yieldable inwardly from the margin of the sole in advance of said overlaying means.

102. In a pulling-over machine, the combination with grippers movable to pull an upper over a last and means movable inwardly to lay the upper over the margin of the sole of the shoe, of means for engaging the sole adjacent to its edge to position the margin of the sole in relation to the last during the upper pulling movement of the grippers, the machine being constructed to cause said sole engaging means to move inwardly from the margin of the sole in advance of said overlaying means, and power means for operating said grippers and overlaying means in sequence.

103. In a machine of the class described, the combination with upper pulling means and means for laying the upper over the margin of the sole of the shoe, of a member for engaging the sole adjacent to its edge to position the sole on the last, said member being mounted for movement inwardly from the edge of the sole to permit the upper to be laid over the margin of the sole, and means for engaging said member frictionally to delay its return movement during the return of other portions of the machine to starting position.

104. In a pulling-over machine, the combination with a gripper for pulling an upper over a last and means for laying the upper over the margin of the sole of the shoe, of a member arranged to engage the margin of the sole close to the gripper when the shoe is presented to the machine and to position said margin during the upper pulling operation, said member being movable inwardly from the margin of the sole to permit the operation of said overlaying means, means for returning said member and the gripper subsequently to starting position, and means for delaying the return movement of said member to prevent interference of the member with the return movement of the gripper.

105. In a pulling-over machine, the combination with grippers for pulling an upper over a last, of a pair of hold-down members for engaging the margin of the sole of the shoe at opposite sides of the forepart, said members being movable inwardly from the margin of the sole to permit the upper to be carried over the shoe bottom, and means for delaying outward return movement of said members to prevent interference with the return of the grippers to starting position.

106. In a machine of the class described, the combination with upper pulling means, a sole rest and means for moving said sole rest in directions toward and from the shoe, of means for engaging the margin of the sole to position it relatively to the last, said margin engaging means being mounted for yielding movement out of operative position as the upper is carried over the margin of the sole, and means operated by movement of said sole rest for retaining said margin engaging means in inoperative position and for releasing it to permit it to return to operative position.

107. In a machine of the class described, a pair of members 76 for positioning the margin of a sole on a last, spring means 78 for separating said members, and a friction plate 82 for controlling the movement of said members.

108. In a pulling-over machine, the combination with means for pulling an upper over a last at the toe and at opposite sides of the forepart, means movable inwardly to lay the upper over the margin of the sole of the shoe, and power means for operating said upper pulling means and overlaying means in sequence, of a member for engaging the margin of the sole opposite to said overlaying means to hold the margin in position during the upper pulling operation, and yielding means tending to force said member outwardly toward the edge of the sole while permitting the member to be moved inwardly by the action of said overlaying means with the margin of the upper yieldingly held between said member and means.

109. In a pulling-over machine, the combination with upper pulling means for pulling an upper at the sides of the forepart and means for laying the margin of the upper over the sole of the shoe, of a pair of arms extending outwardly toward the sides of the shoe in substantially parallel relation to the plane of the sole to cause their outer ends to engage the margin of the sole at opposite sides of the forepart to position the sole on the last, and yielding means tending to force said arms outwardly while permitting them to be moved inwardly by the action of said overlaying means with the margin of the upper between the arms and the overlaying means.

110. In a turn shoe pulling-over machine, the combination with means for pulling an upper over a last and means for laying the upper over the margin of a sole on the last, of a hold-down member arranged to be positioned over a portion of the sole which projects beyond the edge of the last to prevent the margin of the sole from being displaced relatively to the last in the upper pulling operation, the machine being constructed to cause said member to be moved out of operative position to permit the operation of said overlaying means.

111. In a turn shoe pulling-over machine, the combination with means for pulling an upper over a last and means for laying the upper over the margin of a sole on the last, of a hold-down member arranged to be positioned over a portion of the sole which projects beyond the edge of the last to prevent the margin of the sole from being displaced relatively to the last in the upper pulling operation, the machine being constructed to cause said member to be retracted from the outer edge of the sole through the operative movement of said overlaying means.

112. In a machine of the class described, the combination with means for pulling an upper over a last at the end and the sides of the forepart and end embracing wipers for lasting a portion of the shoe at the toe and along the sides of the forepart, of means for engaging the margin of the sole at the sides of the forepart in locations opposite to the side lasting portions of the wipers to position the sole on the last, the machine being constructed to cause said margin engaging means to be withdrawn from operative position to permit the operation of the wipers.

113. In a machine of the class described, the combination with toe and side grippers for pulling an upper over a last and end embracing wipers for lasting a portion of the shoe at the toe and along the sides of the forepart, of means for engaging the margin of the sole at the sides of the forepart in locations opposite to the side lasting portions of the wipers to position the sole on the last, said margin engaging means being yieldable inwardly from the outer edge of the sole and the machine being constructed to cause said means to be pushed inward by engagement with the upper materials in advance of the wipers.

114. In a pulling-over machine, the combination with a gripper and means for operating said gripper to pull an upper over a last, said operating means being constructed to impart upper pulling movement to the gripper in a direction transverse to the plane of the shoe bottom, of a member movably mounted on said gripper for engagement with the margin of the sole of the shoe to position said margin on the last.

115. In a pulling-over machine, the combination with a gripper and means for operating said gripper to pull an upper over a last, in the direction of the height of the last, of a member mounted on said gripper for engagement with the sole of the shoe to position the sole on the last, and a spring for retracting said member from sole engaging position.

116. In a pulling-over machine, the combination with means for pulling an upper over a last, of a member for engaging the margin of the sole of the shoe to position said margin relatively to the last, said member being mounted for manual movement independently of the upper pulling means in substantially perpendicular relation to the plane of the shoe bottom to permit the operator to position the margin of the sole in the correct relation to the last while the upper is under tension.

117. In a pulling-over machine, the combination with means for positioning a last and an upper, of a gripper for pulling the upper over the last, and a member mounted on said gripper for engaging the margin of the sole of the shoe to position it on the last, said gripper and member being relatively arranged for movement in substantially opposite directions to perform their functions.

118. In a pulling-over machine, the combination with means for pulling an upper over a last comprising a gripper mounted for movement to pull the upper and also for movement over the sole of a shoe on the bottom of the last after the upper has been tensioned, of a member constructed and arranged to engage the margin of the sole prior to the movement of the gripper over the sole to position said margin relatively to the last, said member being mounted for movement over the sole with said gripper.

119. In a pulling-over machine, the combination with means for pulling an upper over a last comprising a gripper mounted for movement to pull the upper and also for movement over the sole of the shoe on the bottom of the last after the upper has been tensioned, of a member mounted on said gripper for engaging the margin of the sole to position it relatively to the last, said member being movable relatively to the gripper toward and from the sole and movable with the gripper over the sole.

120. In a pulling-over machine, the combination with a gripper for pulling an upper over a last, of a device slidingly mounted on said gripper for movement into or out of engagement with the margin of the sole of the shoe to position it on the last.

121. In a machine of the class described, an axis transverse to the direction of movement of the support, an overlaying member mounted on said carrier, and spring means tending to swing said carrier in a direction to cause said member to press the upper down upon the margin of the sole while permitting said member and the carrier to yield in response to resistance of the shoe materials over the margin of the sole.

132. In a machine of the class described, the combination with upper pulling means, of means for laying the margin of the upper over the sole of the shoe, said overlaying means comprising a support movable laterally of the edge of the shoe bottom, a carrier mounted on said support to swing about an axis transverse to the direction of movement of the support, an overlaying member slidably mounted in said carrier to yield backwardly from the shoe, and spring means tending to slide said member forwardly and to swing the carrier in a direction to cause said member to press the upper materials down upon the margin of the sole.

133. In a machine of the class described, the combination with upper pulling means, of means for laying the margin of the upper over the sole of the shoe, said overlaying means comprising a support movable laterally of the edge of the shoe bottom, a carrier mounted on said support to swing about an axis transverse to the direction of movement of the support, an overlaying member slidably mounted in said carrier to yield backwardly from the shoe, an operating member having bearing engagement with said slidable member and also with said carrier, and a spring arranged to bear upon said operating member with a tendency to slide said overlaying member forwardly and also to swing the carrier in a direction to cause the overlaying member to press the upper materials down upon the margin of the sole.

134. In a pulling-over machine, the combination with upper pulling means including side grippers, and means movable inwardly at the sides of the shoe into position for holding and fastening the tensioned upper, of means constructed and arranged to move said grippers rearwardly lengthwise of the shoe after they have pulled the upper to make way for the upper holding and fastening means and in the continued operation of the machine to return them to their former position lengthwise of the shoe.

135. In a pulling-over machine, the combination with upper pulling means including side grippers, and means movable inwardly at the sides of the shoe into position for fastening the tensioned upper, of spring means constructed and arranged to move said grippers lengthwise of the shoe out of the path of the upper fastening means, and a tripping device arranged to render said spring means effective to perform its function.

136. In a pulling-over machine, the combination with upper pulling means including side grippers, and means movable inwardly at the sides of the shoe into position for fastening the tensioned upper, of means constructed and arranged for operation after the upper has been pulled to move said grippers rearwardly lengthwise of the shoe a sufficient distance to clear said fastening means in its inward movement.

137. In a pulling-over machine, means for gripping a layer of upper materials, manual means for controlling the closing of said gripping means upon the material, and additional means automatically controlled with respect to closing movement for gripping another layer of the materials in substantially the same location lengthwise of the edge of the work as said first means.

138. In a pulling-over machine, means for gripping a layer of upper materials, manual means for causing said gripping means to grip the material before the machine is started, and additional means constructed and arranged for automatic operation after the starting of the machine to grip another layer of the materials in substantially the same location lengthwise of the edge of the work as said first means.

139. In a pulling-over machine, a gripper arranged to be closed upon a layer of upper materials before the machine is started, and means adjacent to said gripper constructed and arranged for operation upon a pulling movement of the gripper to grip and pull another layer of the materials.

140. In a machine of the class described, upper pulling means comprising a plurality of gripper jaws arranged to grip different layers of the upper materials separately, and means for controlling the closing movement of different jaws to cause one layer of the materials to be gripped before the machine is started and another layer to be gripped after the starting of the machine.

141. In a machine of the class described, upper pulling means comprising a pair of gripper jaws arranged to grip a layer of the upper materials, and a third jaw separately controlled with respect to gripping movement and arranged to coöperate with one of the jaws of said pair to grip another layer of said materials.

142. In a machine of the class described, upper pulling means comprising a pair of gripper jaws arranged to grip a layer of the upper materials, means for closing said jaws on the material, a third jaw arranged to coöperate with one of the jaws of said pair to the combination with means for positioning a shoe and a last, a gripper for engaging the upper of the shoe, and means for effecting relative movement of the gripper and the last to pull the upper, of means carried by the gripper for engaging the marginal edge of the sole of the shoe to position it relatively to the last, said sole edge engaging means being mounted for bodily movement along the gripper in a path substantially parallel to the direction of the pull on the upper.

122. In a machine of the class described, the combination with means for positioning a shoe and a last, a gripper for engaging the upper of the shoe, and means for imparting updraw movement to the gripper, of a member mounted on the gripper for engagement with the margin of the sole of the shoe to position it on the last, said member being movable bodily along the gripper into and out of operative position, and spring means tending to withdraw said member from operative position.

123. In a machine of the class described, the combination with means for working an upper over a last and means for fastening the upper at the opposite sides of the forepart substantially simultaneously, of means for engaging the sole of the shoe to position its marginal edge in the correct relation to the last, the machine being constructed to cause said sole engaging means to be withdrawn from operative position in time relation to the operation of the fastening means.

124. In a machine of the class described, the combination with means for working an upper over a last and means for fastening the upper at the opposite sides of the forepart substantially simultaneously, of means for engaging the sole of the shoe to position its marginal edge in the correct relation to the last, the machine being constructed to cause said sole engaging means to be moved inwardly from the outer edge of the sole to make way for the fastening means.

125. In a pulling-over machine, the combination with grippers and means for moving them in a direction transverse to the plane of the bottom of a last to pull an upper at the toe and at opposite sides of the forepart of the last substantially simultaneously, of means for engaging the margin of the sole of the shoe to position it on the last during said operative movement of the grippers, said margin engaging means being mounted for movement along the plane of the sole toward and from operative position.

126. A pulling-over machine having, in combination, a toe gripper, side grippers, means for operating said grippers to pull the upper and then to move them inward over the sole of the shoe, means for engaging the sole at its opposite sides to position the margin of the sole in the correct relation to the last, and a member for engaging and positioning the margin of the sole at the toe end of the last, said member being mounted for inward movement over the sole with the toe gripper.

127. A pulling-over machine having, in combination, grippers for engaging an upper at the toe and at opposite sides of a last, means for effecting relative movement of the last and said grippers to pull the upper, means for engaging the sole at the opposite sides of the last to position the margin of the sole in the correct relation to the last, and means movable in a direction substantially perpendicular to the plane of the shoe bottom to engage and position the marginal edge of the sole at the toe end of the last.

128. A pulling-over machine having, in combination, means for pulling an upper at the toe and at opposite sides of a last, a sole rest, means on the sole rest for engaging the margin of the sole at the opposite sides of the last to position the margin in the correct relation to the last in the upper pulling operation, and means mounted independently of the sole rest for engaging and positioning the margin of the sole at the toe end of the last.

129. A pulling-over machine having, in combination, means for pulling an upper at the toe and at opposite sides of a last and for then holding the upper under tension, means for engaging the margin of the sole at the opposite sides of the last to position the margin in the correct relation to the last in the upper pulling operation, and means movable at the will of the operator after the upper pulling operation to engage and position the margin of the sole at the toe end of the last.

130. A pulling-over machine having, in combination, toe and side grippers, a sole rest, means for effecting relative movement of said grippers and sole rest to pull the upper, means on the sole rest for engaging the margin of the sole at the opposite sides of the last to position said margin in the correct relation to the last in the upper pulling operation, and means supported on the toe gripper for movement at the will of the operator into position to press the margin of the sole at the toe end of the shoe down upon the last after the upper pulling operation.

131. In a machine of the class described, the combination with upper pulling means, of means for laying the margin of the upper over the sole of the shoe, said overlaying means comprising a support movable laterally of the edge of the shoe bottom, a carrier mounted on said support to swing about grip another layer of the materials, and additional means for closing said third jaw on the material.

143. In a machine of the class described, upper pulling means comprising a pair of gripper jaws arranged to grip a layer of the upper materials, means for causing said jaws to grip the material before the machine is started, a third jaw arranged to coöperate with one of the jaws of said pair to grip another layer of the materials, and means automatically operative after the starting of the machine to move said third jaw into gripping relation to the material.

144. In a machine of the class described, upper pulling means comprising a pair of gripper jaws arranged to grip a layer of the upper materials, manually controlled means for closing said jaws on the material before the machine is started, a third jaw arranged to coöperate with one of the jaws of said pair to grip another layer of the materials, and means subject to automatic control after the machine is started to close said third jaw on the material.

145. In a pulling-over machine, the combination with upper pulling means and overlaying means, of a member normally positioned out of engagement with the sole of the shoe and arranged to permit the operator to move it momentarily into engagement with the marginal edge of the sole to press said edge into the correct relation to the last, and spring means for returning said member to inoperative position.

146. In a pulling-over machine, the combination with upper gripping means and power operated mechanism constructed to effect relative movement of said gripping means and a last for pulling the upper and to cause the parts to come automatically to rest with the upper held under tension for the inspection of the operator, of means normally maintained in an inoperative position and arranged to permit the operator to move it into position to press the marginal edge of the sole into the correct relation to the last while the upper is under tension.

147. In a machine of the class described, the combination with gripper jaws and a support for said jaws, of a member on said support movable at the will of the operator into position to engage the marginal edge of the sole of the shoe to position said edge in the correct relation to the last.

148. In a machine of the class described, the combination with means for positioning a shoe and a last, gripper jaws for engaging and pulling the upper of the shoe, and a support for said jaws extending in a direction transverse to the plane of the sole of the shoe, of a member mounted on said support for engaging the margin of the sole to position it relatively to the last, said member being movable along the support into and out of operative position.

149. In a machine of the class described, the combination with means for positioning a shoe and a last, an upper engaging gripper, and means for moving said gripper to pull the upper and then to draw the upper inwardly over the sole of the shoe, of means associated with said gripper for engaging the margin of the sole to position it relatively to the last, said sole positioning means being mounted for movement inwardly with the gripper and also for movement relatively to the gripper into or out of operative position.

150. In a machine of the class described, the combination with upper pulling means, and upper fastening means movable inwardly over the margin of the sole of the shoe, of overlaying means movable to press the margin of the upper inwardly into position to be fastened, and means for engaging the margin of the sole to position it in the correct relation to the bottom of the last, said margin engaging means being arranged to be pushed inwardly by contact with the margin of the upper in the operative movement of the overlaying means.

151. In a machine of the class described, the combination with upper pulling means, and upper fastening means movable inwardly over the margin of the sole of the shoe, of means for engaging the margin of the sole to position it in the correct relation to the bottom of the last, said margin engaging means being arranged to be pushed inwardly over the sole to make way for the fastening means.

152. In a machine of the class described, the combination with upper pulling means for the opposite sides of a shoe, of a sole rest having members extending along the sole and outwardly toward the side edges of the sole to position the margin of the sole relatively to the last, said members being yieldable to inwardly directed pressure to permit the margin of the upper to be overlaid and fastened.

153. In a machine of the class described, the combination with end embracing wipers and fastening means movable inward laterally of a shoe at its opposite sides, of sole edge hold-down members extending along the sole and spring pressed outwardly over portions of the margin of the sole at opposite sides of the end portion of the shoe, said members being yieldable inwardly in response to the pressure of the closing wipers.

154. In a machine of the class described, the combination with means for wiping the margin of an upper inwardly, of means arranged to engage the margin of the upper at its inner side and hold it against the wiping means, yieldable means tending to force said margin engaging means outwardly while permitting it to be moved inwardly by the wiping means, and means for restraining said margin engaging means from outward return movement.

155. In a machine of the class described, the combination with upper gripping means and power operated mechanism constructed to effect relative movement of said gripping means and the last for pulling the upper and to cause the parts to come automatically to rest with the upper held under tension for the inspection of the operator, of means for overlaying and fastening the margin of the upper when the machine is again started, and means for engaging the marginal edge of the sole to position it in the correct relation to the last prior to the overlaying operation, said edge engaging means being movable into an inoperative position to permit the upper to be overlaid and fastened.

156. In a machine of the class described, the combination with power operated upper pulling means constructed and arranged to come automatically to rest and then to hold the upper under tension for the inspection of the operator, of end lasting wipers arranged to operate upon the shoe only after the machine has been again started, and means for positioning the marginal edge of the sole in the correct relation to the last before the upper is wiped inwardly over the sole, said positioning means being movable into an inoperative position to permit the operation of the wipers.

157. In a machine of the class described, the combination with means for pulling an upper over a last, and means for laying the margin of the upper inwardly over the bottom of the last, of conforming means arranged to engage the upper materials at the opposite sides of the toe and movable independently of said overlaying means along the surface of said materials in a direction transverse to the plane of the last bottom to conform said materials to the lateral contour of the last prior to the overlaying operation.

158. In a machine of the class described, the combination with means for pulling an upper over a last, and means for laying the margin of the upper inwardly over the bottom of the last, of conforming means comprising a flexible member adapted to be wrapped around the toe in engagement with the upper materials and movable independently of said overlaying means in a direction transverse to the plane of the last bottom to conform said materials to the lateral contour of the last after the upper has been pulled and prior to the overlaying operation.

159. In a machine of the class described, the combination with power operated means automatically operative to pull an upper over a last and to come to a stop with the upper held under tension, and means automatically operative upon a subsequent starting of the machine to lay the margin of the upper inwardly over the bottom of the last, of conforming means arranged to be operated while the machine is at rest in the interval between the upper pulling operation and the overlaying operation and movable along the surface of the upper materials in a direction transverse to the plane of the last bottom to conform said materials to the lateral contour of the last.

160. In a machine of the class described, the combination with power operated means automatically operative to pull an upper over a last and to come to a stop with the upper held under tension, and means automatically operative upon a subsequent starting of the machine to lay the margin of the upper inwardly over the bottom of the last, of conforming means arranged to be moved into embracing relation to the toe of the shoe while the machine is at rest in the interval between the upper pulling operation and the overlaying operation and to be moved independently of the overlaying means along the surface of the upper materials in a direction transverse to the plane of the last bottom to conform said materials to the lateral contour of the last.

161. In a gripper bar for pulling over machines, in combination, a fixed jaw, a pivoted jaw having a face formed to coöperate with said fixed jaw to clamp an upper therebetween, and having its opposite face formed to engage a lining, said pivoted jaw thus spacing the upper and lining where clamped, and a third jaw pivoted to coöperate with said first-named pivoted jaw and operable independently of the operation of said first named pivoted jaw to clamp a lining therebetween.

162. In a machine for pulling over turn shoes, in combination, means for engaging the upper only of the shoe to allow the lining to be thrown back to expose the tip marking for gaging, and means operating independently of the operation of said upper-engaging means for independently engaging the lining only to lay it over the upper.

163. In a machine for pulling over turn shoes, in combination, means for engaging the upper only of the shoe to allow the lining to be thrown back to expose the tip marking for gaging, means operating independently of the operation of said upper-engaging means for independently engaging the lining only to lay it over the upper, means for simultaneously pulling over the upper and lining, and means for inserting a plurality of fastenings simultaneously through said pulled over upper and lining.

164. In combination with a machine having pulling over and fastener-driving instrumentalities, an upper clamping jaw, and an independently operating lining clamping jaw, means operating independently of the operation of said upper-engaging means for actuating said pulling over instrumentalities to cause said upper and lining to be simultaneously pulled over, and means for actuating said fastener-driving instrumentalities to insert a plurality of fastenings simultaneously through said pulled over upper and lining.

In testimony whereof I have signed my name to this specification.

HANNAH ASHTON,
*Executrix of the will of Orrell Ashton, deceased.*